(12) United States Patent
Chung

(10) Patent No.: US 7,798,009 B2
(45) Date of Patent: Sep. 21, 2010

(54) NEGATIVE PRESSURE GAUGE WITH A SWITCH

(75) Inventor: Donny Chung, Taipei (TW)

(73) Assignee: Pacific Hospital Supply Co., Ltd., Taipei (TW)

( * ) Notice: Subject to any disclaimer, the term of this patent is extended or adjusted under 35 U.S.C. 154(b) by 102 days.

(21) Appl. No.: 12/371,958

(22) Filed: Feb. 17, 2009

(65) Prior Publication Data

US 2010/0206087 A1    Aug. 19, 2010

(51) Int. Cl.
*G01L 7/00* (2006.01)
(52) U.S. Cl. ....................................................... 73/756
(58) Field of Classification Search ........................ None
See application file for complete search history.

(56) References Cited

U.S. PATENT DOCUMENTS 4,698,060 A * 10/1987 D'Antonio et al. .......... 604/320

* cited by examiner

Primary Examiner—Andre J Allen
(74) Attorney, Agent, or Firm—Chun-Ming Shih; HDLS IPR Services

(57) ABSTRACT

A negative pressure gauge includes a body, a positioning means, a display model, a power-supplying unit and a switch. The positioning means has a rotary piece pivotally connected to the body. The rotary piece is formed with a trigger protrusion. The display model is fixed to the body. The power-supplying unit is fixed to the body and electrically connected to the display model via an electrical line. The switch is mounted in the body and arranged to correspond to the trigger protrusion of the rotary piece. The switch is mounted on the electrical line. In normal state, the switch generates a broken circuit between the display model and the power-supplying unit. When the rotary piece rotates with respect to the body, the switch will be triggered by the trigger protrusion, so that the power-supplying unit and the display model are electrically connected to each other. Via this arrangement, the display model can be turned on or off selectively to save the electricity.

9 Claims, 4 Drawing Sheets

NEGATIVE PRESSURE GAUGE WITH A SWITCH

BACKGROUND OF THE INVENTION

1. Field of the Invention

The present invention relates to a negative pressure gauge, and in particular to a negative pressure gauge with a switch.

2. Description of Prior Art

A common negative pressure gauge has to be provided with a display unit for displaying the amount of airflow in operation, so that a user can adjust the amount of gas flowing through the negative pressure gauge according to the practical conditions. The display unit is usually divided into analog type and digital type. The digital display unit is powered by electricity. Thus, the negative pressure gauge having a digital display unit is usually provided with a power-supplying unit therein. For example, a battery is installed in the display unit to supply the necessary electricity, so that the pressure value of the gas flowing through the negative pressure gauge can be displayed on the display unit.

In practice, such a structure of the negative pressure gauge has a problem. Since the display unit is electrically connected to the power-supplying unit, the display unit will display the pressure value of a gas after the battery is installed in the negative pressure gauge. However, the display unit is not provided with a power switch, so that the power-supplying unit will supply power continuously. Even the negative pressure gauge is not in use, the display unit will remain turned on. One solution of this problem is to detach the battery from the negative pressure gauge. Such an action requires more time. Also, when a user intends to use the negative pressure gauge, he/she has to install the battery in the negative pressure gauge again, which makes the user feel inconvenient.

Therefore, in order to overcome the above problems, the present Inventor proposes a reasonable and novel structure based on his delicate researches and expert experiments.

SUMMARY OF THE INVENTION

The present invention is to provide a negative pressure gauge with a switch, in which the switch is used to switch the normal circuit or broken circuit state between a power-supplying unit and a display unit, thereby saving electricity.

The present invention is to provide a negative pressure gauge with a switch, which includes a body, a positioning means, a display unit, a power-supplying unit and a switch. The positioning means comprises a rotary piece pivotally connected to the body. The rotary piece is formed with a trigger protrusion. The display model is fixed to the body. The power-supplying unit is fixed to the body and electrically connected to the display unit via an electric line. The switch is mounted in the body and arranged to correspond to the trigger protrusion of the rotary piece. The switch is mounted on the electric line. In normal state, the switch generates a broken circuit between the display unit and the power-supplying unit. When the rotary piece rotates with respect to the body, the switch is triggered by the trigger protrusion, whereby the power-supplying unit and the display unit are electrically connected.

In comparison with prior art, the present invention has advantageous features as follows. The negative pressure gauge is provided with a switch, and thus the power-supplying unit can selectively supply electricity. Via this arrangement, the electricity may not be wasted. As a result, the lifetime of the power-supplying unit is increased. Thus, the number of times for replacing the power-supplying unit is reduced, and the convenience in use is improved.

DETAILED DESCRIPTION OF THE INVENTION

The characteristics and technical contents of the present invention will be explained with reference to the accompanying drawings. However, the drawings are illustrative only but not used to limit the present invention.

Figure 1:
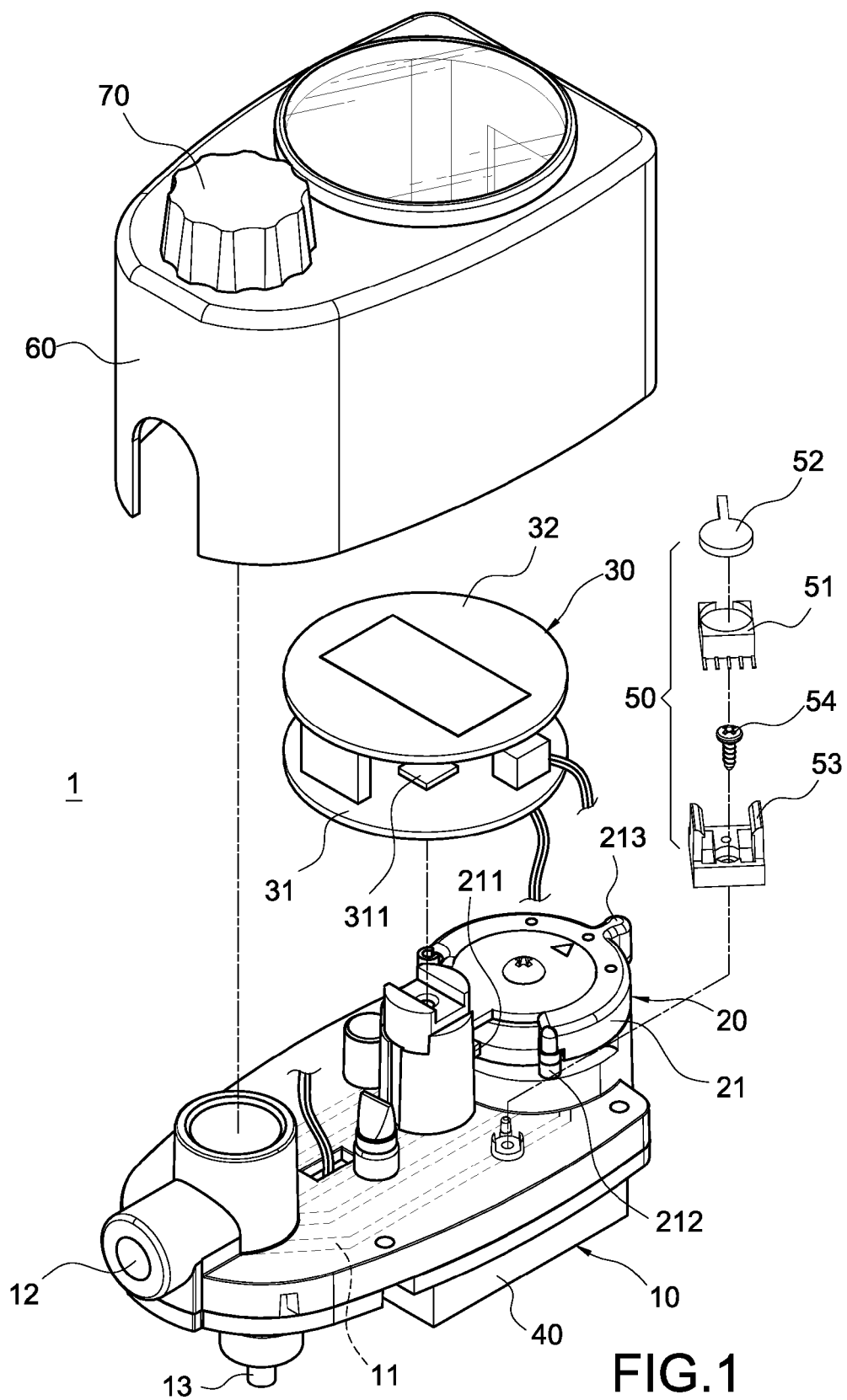
FIG. 1 is an exploded perspective view of the present invention.

Please refer to FIG. 1, which is an exploded perspective view of the present invention. The present invention provides a negative pressure gauge with a switch, which includes a body 10, a positioning means 20, a display model 30, a power-supplying unit 40 and a switch 50.

The body 10 is formed with an airflow passage 11 communicating with the outside as well as an exhaust port 12 and an intake port communicating with the airflow passage 11.

The positioning means 20 comprises a rotary piece 21 pivotally connected to the body 10. The rotary piece 21 is able to rotate with respect to the body 10. The rotary piece 21 is formed with a trigger protrusion 211 and another trigger protrusion 212. The trigger protrusion 211 and the trigger protrusion 212 are separated from each other by a distance.

The display model 30 is fixed to the body 10. The display model 30 comprises a circuit board 31 and a display panel 32 superposed on the circuit board 31. The display panel 32 is electrically connected to the circuit board 31. The circuit board 31 has a sensor unit 311 that is partially accommodated in the airflow passage 11 for sensing the pressure of gas within the airflow passage 11 and then displaying the pressure value on the display panel 32.

Figure 2:
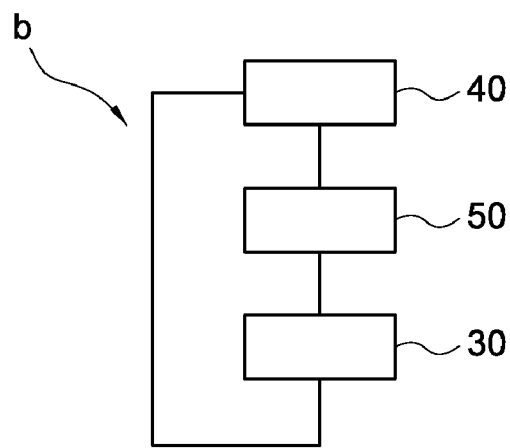
FIG. 2 is a schematic view showing the circuit layout of the present invention.

The power-supplying unit 40 is fixed on the back surface of the body 10 and is electrically connected to the display model 30 via an electrical line b (FIG. 2). The negative pressure gauge 1 further includes an outer cover 60 covering above the body 10 and a flow regulator 70. The flow regulator 70 is inserted into the body 10 and partially accommodated in the airflow passage 11. The flow regulator 70 can be rotated to control the amount of gas flowing through the airflow passage 11.

The switch 50 is mounted in the body 10 and arranged to correspond to the trigger protrusion 211 of the rotary piece 21. The switch 50 is mounted in the electrical line b (FIG. 2). In normal state, the switch 50 generates a broken circuit between the display unit 30 and the power-supplying unit 40. When the rotary piece 21 rotates with respect to the body 10, the switch 50 is triggered by the trigger protrusion 211, so that the power-supplying unit 40 and the display model 30 are electrically connected to each other.

Specifically, the switch 50 comprises a connector 51, a switching unit 52 pivotally connected to the connector 51, a base 53 connected to the body 10, and a fixing element 54. The base 53 allows the connector 51 and the switching unit 52 to be received therein. The switching unit 52 is arranged to correspond to the trigger protrusion 211. The fixing element 54 is used to fix the base 53 on the body 10.

When the switching unit 52 activates the trigger protrusion 211 and the trigger protrusion 212, the connector 51 makes the power-supplying unit 40 and the display model 30 to be electrically connected to each other, thereby activating the operation of the display model 30.

Please refer to FIG. 2, which is a schematic view showing the circuit layout of the present invention. Please also refer to FIG. 1. The power-supplying unit 40 and the display model 30 are electrically connected with each other via an electrical line b. The switch 50 is mounted on the electrical line b. The sensor unit 311 converts the sensed pressure value into current signals and sends these current signals to the circuit board 31. The current signals are processed by the circuit board 31 and sent to the connector 51. When the rotary piece 21 is rotated, there are three kinds of relationship among the switching unit 51, the trigger protrusion 211 and the trigger protrusion 212. First, both the trigger protrusion 211 and the trigger protrusion 212 do not abut the switching unit 52. Second, only the trigger protrusion 211 abuts the switching unit 52. Third, only the trigger protrusion 212 abuts the switching unit 52.

When both the trigger protrusion 211 and the trigger protrusion 212 do not abut the switching unit 52, a broken circuit is formed between the power-supplying unit 40 and the display model 30. At this time, the display panel 32 is turned off, so that the electricity of the power-supplying unit 40 will not be consumed. When the user rotates the rotary piece 21 to make the trigger protrusion 211 to abut the switching unit 52 or make the trigger protrusion 212 to abut the switching unit 52, the connector 51 of the switch 50 will be triggered, thereby making the power-supplying unit 40 and the display model 30 to be electrically connected. In this way, the pressure value of gas sensed by the sensor unit 311 can be displayed on the display panel 32.

Figure 3:
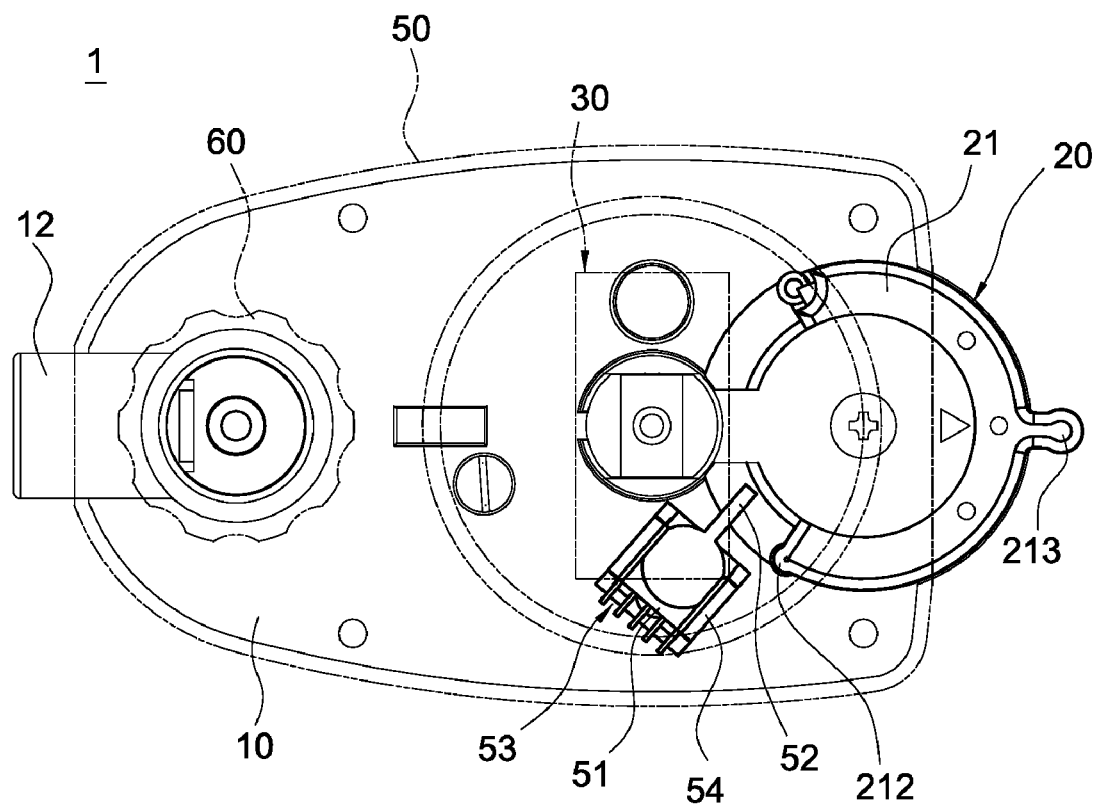
FIG. 3 is a top view of the present invention.
Figure 4:
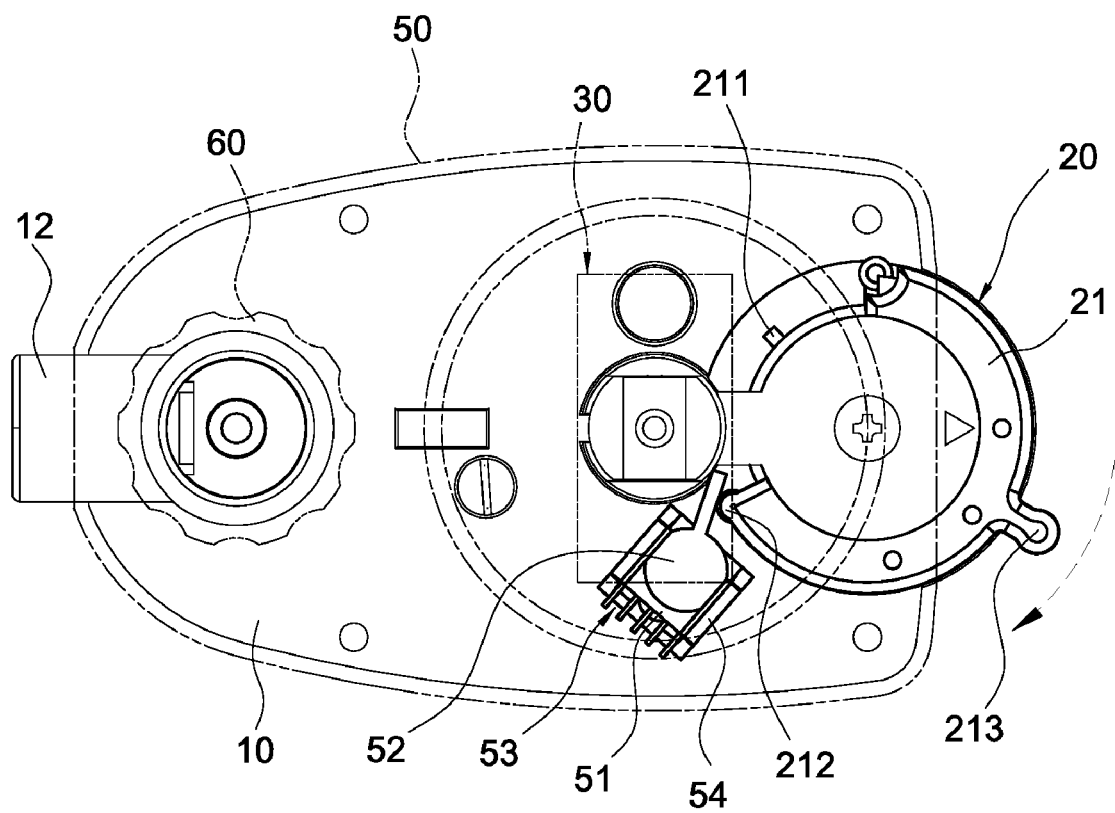
FIG. 4 is a top view (I) showing the action of the present invention.
Figure 5:
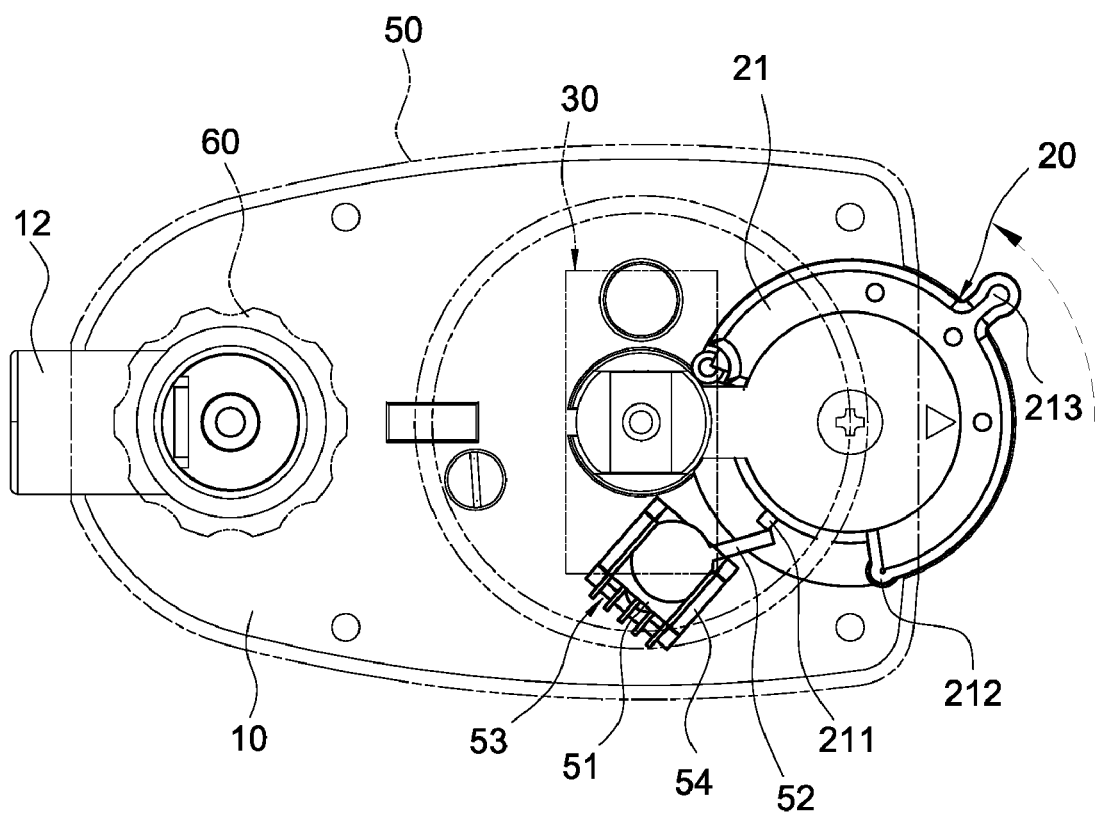
FIG. 5 is a top view (II) showing the action of the present invention.

Please refer to FIGS. 3 to 5. FIG. 3 is a top view of the present invention. FIGS. 4 and 5 are top views (I) and (II) showing the action of the present invention respectively. Please refer to FIG. 3. It can be seen that the trigger protrusion 211 and the trigger protrusion 212 of the rotary piece 21 are not brought into contact with the switching unit 52. Thus, at this time, the display panel 32 is turned off, so that the pressure value of gas sensed by the sensor unit 311 will not be displayed on the display panel 32.

Please refer to FIGS. 4 and 5. When the user turns an operating rod 213 to make the rotary piece 21 to rotate with respect to the body 10, the trigger protrusion 212 will abut the switching unit 52 to trigger the switching unit 52, thereby making the connector 51 to be electrically connected. At this time, the display panel 32 will be activated to display the pressure value of gas. Similarly, when the trigger protrusion 211 abuts the switching unit 52 to trigger the switching unit 52, the display panel 32 will be also activated to display the pressure value of gas. The trigger protrusion 211 or the trigger protrusion 212 abuts the switching unit 52 will switch different display models to display the pressure value of gas.

According to the above, the negative pressure gauge with a switch already demonstrates industrial practicability, novelty and inventive steps. Further, the structure of the present invention has not been seen in products of the same kind or let in public use, so that the present invention really conforms to the requirements for a utility model patent.

What is claimed is:

1. A negative pressure gauge, comprising:
a body;
a positioning means having a rotary piece pivotally connected to the body, the rotary piece being formed with a trigger protrusion;
a display model fixed to the body;
a power-supplying unit fixed to the body and electrically connected to the display model via an electrical line; and
a switch mounted in the body and arranged to correspond to the trigger protrusion of the rotary piece, the switch being mounted on the electrical line, the normal state of the switch generating a broken circuit between the display model and the power-supplying unit;
wherein when the rotary piece rotates with respect to the body, the switch is triggered by the trigger protrusion, thereby making the power-displaying unit and the display model to be electrically connected to each other.

2. The negative pressure gauge according to claim 1, wherein the switch comprises a connector, a switching unit pivotally connected to the connector, and a base connected to the body, the base allows the connector and the switching unit to be accommodated therein, the switch unit is arranged to correspond to the trigger protrusion.

3. The negative pressure gauge according to claim 2, wherein the rotary piece is formed with another trigger protrusion, this another trigger protrusion is separated from the trigger protrusion to correspond to the switching unit respectively.

4. The negative pressure gauge according to claim 1, wherein the body is formed with an airflow passage as well as an intake port and an exhaust port communicating with the airflow passage.

5. The negative pressure gauge according to claim 1, further comprising a flow regulator inserted in the body and partially accommodated in the airflow passage for controlling the amount of gas flowing through the airflow passage.

6. The negative pressure gauge according to claim 1, wherein the rotary piece is formed with an operating rod.

7. The negative pressure gauge according to claim 1, wherein the display model comprises a circuit board and a display panel electrically connected to the circuit board.

8. The negative pressure gauge according to claim 7, wherein the circuit board has a sensor unit, the sensor unit is partially accommodated in the airflow passage for sensing the pressure of gas in the airflow passage.

9. The negative pressure gauge according to claim 1, further comprising an outer cover covering the body.

* * * * *